United States Patent
Tanaka

(10) Patent No.: US 8,273,683 B2
(45) Date of Patent: Sep. 25, 2012

(54) ACTIVE CARBON, PRODUCTION METHOD THEREOF AND POLARIZABLE ELECTRODE

(75) Inventor: Masako Tanaka, Tokyo (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 12/708,467

(22) Filed: Feb. 18, 2010

(65) Prior Publication Data

US 2010/0142122 A1 Jun. 10, 2010

Related U.S. Application Data

(63) Continuation of application No. 10/534,763, filed as application No. PCT/JP03/14379 on Nov. 12, 2003, now Pat. No. 7,691,782.

(60) Provisional application No. 60/428,714, filed on Nov. 25, 2002.

(30) Foreign Application Priority Data

Nov. 13, 2002 (JP) .................................. 2002-329490

(51) Int. Cl.
  *C01B 31/08* (2006.01)
  *H01G 9/00* (2006.01)
(52) U.S. Cl. ...... 502/416; 502/427; 361/502; 252/182.1
(58) Field of Classification Search .......... 502/416–438; 361/502; 252/182.1
See application file for complete search history.

(56) References Cited

U.S. PATENT DOCUMENTS

| | | | | |
|---|---|---|---|---|
| 2,257,907 | A | * | 10/1941 | Griswold ...................... 502/431 |
| 3,168,485 | A | * | 2/1965 | Knobloch et al. ............ 502/426 |
| 4,556,547 | A | | 12/1985 | Nishino et al. |
| 4,937,223 | A | * | 6/1990 | Yamaguchi ................... 502/427 |
| 5,956,225 | A | | 9/1999 | Okuyama et al. |
| 6,038,123 | A | | 3/2000 | Shimodaira et al. |
| 6,094,338 | A | | 7/2000 | Hirahara et al. |
| 6,191,935 | B1 | | 2/2001 | Okamura et al. |
| 6,205,016 | B1 | | 3/2001 | Niu |
| 6,414,837 | B1 | * | 7/2002 | Sato et al. ..................... 361/504 |
| 6,454,816 | B1 | | 9/2002 | Lee et al. |
| 6,491,789 | B2 | | 12/2002 | Niu |

(Continued)

FOREIGN PATENT DOCUMENTS

CA 2453968 * 3/2003

(Continued)

OTHER PUBLICATIONS

Database CA Chemical Abstracts Service, Columbus, Ohio, US; Yamamoto, Kazutome et al: "Double-Layer Capacitor Using Activated Carbon Electrode," XP002274284, Abstracting JP 10-335189A.

(Continued)

*Primary Examiner* — Daniel C. McCracken

(74) *Attorney, Agent, or Firm* — Sughrue Mion, PLLC

(57) ABSTRACT

The present invention relates to an active carbon containing an alkaline earth metal compound inside the particle and having a specific surface area of 10 to 2,000 $m^2/g$, which is suitable to be used for polarizable electrodes in an electric double layer capacitor. The active carbon of the present invention enables to increase the capacitance of an electric double layer capacitor as well as to control the expansion of electrodes. The active carbon of the present invention can be obtained by adding an alkaline earth metal compound to a material such as pitch and performing heat treatment and activation.

23 Claims, 1 Drawing Sheet

U.S. PATENT DOCUMENTS

| | | |
|---|---|---|
| 6,780,388 B2 | 8/2004 | Masuko et al. |
| 6,842,328 B2 | 1/2005 | Schott et al. |
| 7,061,749 B2 | 6/2006 | Liu et al. |
| 7,122,132 B2 | 10/2006 | Morita et al. |
| 2003/0179537 A1* | 9/2003 | Tanaka et al. ............... 361/502 |

FOREIGN PATENT DOCUMENTS

| | | | |
|---|---|---|---|
| CA | 2453968 | A1 | 3/2003 |
| CN | 1048955 | C | 2/2000 |
| EP | 1 176 617 | A2 | 1/2002 |
| JP | 48-93591 | A | 12/1973 |
| JP | 57-136455 | A | 8/1982 |
| JP | 3-16908 | A | 1/1991 |
| JP | 5-258996 | A | 10/1993 |
| JP | 09-155187 | A | 6/1997 |
| JP | 10-121336 | A | 5/1998 |
| JP | 10-335189 | A | 12/1998 |
| JP | 11-031637 | A | 2/1999 |
| JP | 11-317333 | A | 11/1999 |
| JP | 2000-233913 | A | 8/2000 |
| JP | 2001-40548 | A | 2/2001 |
| JP | 2001-110689 | A | 4/2001 |
| JP | 2001-118576 | | 4/2001 |
| JP | 2001-210564 | A | 8/2001 |
| JP | 2001-229926 | A | 8/2001 |
| JP | 2002-266170 | A | 9/2002 |
| WO | 0192151 | A1 | 12/2001 |
| WO | 03024868 | A1 | 3/2003 |

OTHER PUBLICATIONS

Database CA Chemical Abstracts Service, Columbus, Ohio, US; Murakami, Shigeru et al: "Activated Carbon Fibers, Manufacture, of the Fibers and Activated Carbon Fiber Fabrics and Activated Electrodes," XP002274298, Abstracting JP 2001-040548A.

Database WPI Section CH, Week 199110 Derwent Publications Ltd., London, GB; AN 1991-068946, XP002274268, Abstracting JP 3-16908A.

Database WPI Section CH, Week 198239 Derwent Publications Ltd., London, GB; AN 1982-82628E, XP002274269, Abstracting JP 57-136455A.

Database WPI Section CH, Week 197430 Derwent Publications Ltd., London, GB; AN 1974-54261V, XP002274270, Abstracting JP 48-93591A.

Patent Abstracts of Japan, vol. 2000, No. 25, Apr. 12, 2001, Abstracting JP 2001-210564A.

Tamon H, et al, "Improvement of Mesoporosity of Activated Carbons From PET by Novel Pre-Treatment for Steam Activation," Carbon; Carbon 1999 Elsevier Science Ltd, Exeter, Engl, vol. 37, No. 10, 1999, pp. 1643-1645.

* cited by examiner

ACTIVE CARBON, PRODUCTION METHOD THEREOF AND POLARIZABLE ELECTRODE

CROSS REFERENCE TO THE RELATED APPLICATIONS

This is a continuation of application Ser. No. 10/534,763 filed May 13, 2005, now U.S. Pat. No. U.S. 7,691,782, which is a National Stage of International Application No. PCT/JP2003/014379 filed Nov. 12, 2003, and which claims the benefit pursuant to 35 U.S.C. §119(e) (1) of U.S. Provisional Application No. 60/428,714 filed Nov. 25, 2002.

TECHNICAL FIELD

The present invention relates to an active carbon, particularly an active carbon useful for an electric double layer capacitor (also called an electric double layer condenser). More specifically, the present invention relates to an active carbon which can be suitably used as an electrode material for capacitors having high electric capacitance and high durability, a production method thereof, an electric double layer capacitor electrode (polarizable electrode) using the active carbon and an electric double layer capacitor having the electrode.

BACKGROUND ART

An electric double layer capacitor has characteristics not seen in batteries, for example, the electric double layer capacitor is rapidly chargeable or dischargeable, highly resistant against overcharge and over-discharge, ensured with a long life because of no involvement of a chemical reaction, usable over a wide temperature range and friendly to environment by containing no heavy metal. Therefore, the electric double layer capacitor has been heretofore used for a memory backup power source or the like. Moreover, with recent abrupt progress of large capacitance capacitors, development of use for high-performance energy devices is proceeding and studies are also being made to use the capacitor for an electric power storage system, an engine assist of hybrid cars or the like by combining it with a solar cell or a fuel cell.

The electric double layer capacitor has a structure such that a pair of positive and negative polarizable electrodes each formed of an active carbon or the like are faced with each other through a separator in a solution containing an electrolyte ion. When a direct current voltage is applied to the electrodes, anion in the solution is drawn to the electrode polarized to the positive (+) side and cation in the solution is drawn to the electrode polarized to the negative (−) side, whereby an electric double layer is formed on the interface between the electrodes and the solution and this is used as an electric energy.

Conventional electric double layer capacitors are excellent in the power density but, on the other hand, disadvantageous in that the energy density is inferior. In order to realize use for energy devices, capacitors having a larger capacitance must be developed. For increasing the capacitance of an electric double layer capacitor, it is inevitable to develop an electrode material of forming many electric double layers between the electrodes and the solution.

Accordingly, use of an active carbon having a large specific surface area has been studied with an attempt to form a larger number of electric double layers. However, the active carbon has a problem that the electrode density decreases and therefore, the electric capacitance per volume (F/ml) does not increase as expected, despite excellent electric capacitance per mass (F/g).

In recent years, a technique of producing an active carbon having a microcrystal analogous to graphite and using it as a raw material of the polarizable electrode has been proposed (see, for example, JP-A-11-317333). This active carbon is excellent in that the electric double layer capacitor using it as a raw material of the polarizable electrode has a large electric capacitance (F/ml).

An active carbon obtained by heating a pitch-originated carbon material in the co-presence of an alkali metal hydroxide and thereby activating the material (alkali activation) has been proposed (see, for example, JP-A-5-258996). Also, an electric double layer capacitor having a high electrode density and a large electric capacitance per unit volume has been proposed, which is obtained by alkali-activating a carbon material having a comparatively high crystallinity, so-called mesophase pitch (see, for example, JP-A-10-121336).

However, these active carbons also have a problem and are not satisfactory. More specifically, the active carbon of JP-A-11-317333 expands when a voltage is applied and the cell may be damaged due to expansion. For preventing the expansion, a dimension-limiting structure is necessary and this gives rise to a large problem in the operation of assembling a capacitor. In addition, the electric capacitance is not expressed unless a voltage of about 4 V is previously applied and therefore, the electrolytic solution may be decomposed.

The active carbons of JP-A-5-258996 and JP-A-10-121336 have a problem in that despite large electric capacitance (F/g), the electrode density decreases due to excessive growth of pores and a small electric capacitance (F/ml) results.

DISCLOSURE OF THE INVENTION

An object of the present invention is to provide an active carbon capable of increasing the electric capacitance per electrode in an electric double layer capacitor without applying an excessive voltage, and a production method thereof. Another object of the present invention is to provide an electric double layer capacitor prevented from the expansion of electrode and having high reliability, which is a high-capacitance capacitor using the above-described active carbon as the electrode material.

As a result of extensive investigations to solve those problems, the present invention has been accomplished and provides the following inventions:

1. An active carbon comprising an alkaline earth metal compound in the inside of the particle and having a BET specific surface area of 10 to 2,000 $m^2/g$ as determined by a nitrogen adsorption method.

2. The active carbon as described in 1 above, wherein the alkaline earth metal compound is at least one alkaline earth metal compound selected from the group consisting of beryllium, magnesium, calcium, strontium, barium and radium.

3. The active carbon as described in 1 or 2 above, wherein the alkaline earth metal compound is at least one member selected from the group consisting of alkaline earth metal and oxides, hydroxides, chlorides, bromides, iodides, fluorides, phosphates, carbonates, sulfides, sulfates and nitrates of an alkaline earth metal.

4. The active carbon as described in 3 above, wherein the alkaline earth metal compound is calcium compound.

5. The active carbon as described in 1 above, wherein the alkaline earth metal compound is a particle having a particle size of 10 μm or less.

6. The active carbon as described in 1 above, wherein the content of the alkaline earth metal compound is from 30 to 100,000 ppm by mass.

7. The active carbon as described in 1 above, wherein the ratio of the peak height of D peak (1,360 cm$^{-1}$) to the peak height of G peak (1,580 cm$^1$) in the Raman spectrum is from 0.8 to 1.2.

8. The active carbon as described in 1 above, wherein the volume of pores having a pore size of 20 to 50 Å is in the range of 0.02 ml/g or more as determined by the BJH method using the nitrogen adsorption method.

9. An active carbon wherein a porous carbon layer comprising non-graphitizable carbon is coated on the active carbon as described in 1 above.

10. The active carbon as described in 9 above, wherein the volume of pores is in the range of 0.01 to 1.55 ml/g as determined by the nitrogen adsorption method.

11. The active carbon as described in 9 above, having an average particle size of 3 μm to 70 μm.

12. The active carbon as described in 1 above, which substantially does not contain a particle having an average particle size of 1 μm or less and/or 100 μm or more.

13. The active carbon as described in 1 or 9 above, which is used for a polarizable electrode in an electric double layer capacitor.

14. A polarizable electrode comprising the active carbon described in any one of 1 to 13 above.

15. A polarizable electrode comprising the active carbon described in any one of 1 to 13 above and a vapor grown carbon fiber.

16. The polarizable electrode as described in 15 above, wherein the vapor grown carbon fiber has a hollow structure and has an outer diameter of 2 to 500 nm and an aspect ratio of 10 to 15,000.

17. The polarizable electrode as described in 15 above, wherein the vapor grown carbon fiber has a pore volume of 0.01 to 0.4 ml/g and a BET specific surface area of 30 to 1,000 m$^2$/g as determined by the nitrogen adsorption method.

18. The polarizable electrode as described in 15 above, wherein the spacing of the (002) face of the vapor grown carbon fiber, $d_{002}$, is 0.3395 nm or less.

19. The polarizable electrode as described in 15 above, wherein the vapor grown carbon fiber is a branched fiber and the hollow structure of the branched part communicates with each other.

20. The polarizable electrode as described in 15 above, wherein the vapor grown carbon fiber is mixed in the amount of 0.1 to 20 mass % of the carbon powder material.

21. The polarizable electrode as described in 15 above, wherein the vapor grown carbon fiber is fusion bonded to the surface of the active carbon.

22. An electric double layer capacitor using the polarizable electrode described in any one of 14 to 21 above.

23. The electric double layer capacitor as described in 22 above, which uses an organic electrolytic solution obtained by dissolving an electrolyte in an organic solvent.

24. The slurry containing the active carbon as described in any of 1 to 13 above.

25. The paste containing the active carbon as described in any of 1 to 13 above.

26. The electrode plate, wherein the active carbon as described in any of 1 to 13 above is applied on the surface.

27. The energy device containing an electric double layer capacitor as described in 22 above.

28. A method for producing an active carbon, comprising a step of adding an alkaline earth metal compound to a raw material of active carbon and heat-treating it, and a step of mixing the carbonized product produced by the heat treatment with an alkali metal compound and heating and thereby activating it.

29. A method for producing an active carbon, comprising a step of adding an alkaline earth metal compound to a raw material of active carbon and heat-treating it in the vapor of an alkali metal compound, and a step of mixing the carbonized product produced by the heat treatment with an alkali metal compound and heating and thereby activating it.

30. The method for producing an active carbon as described in 28 or 29 above, wherein the temperature of performing the heat treatment step is kept in a range from 400 to 600° C. and in a range from 600 to 900° C.

31. The method for producing an active carbon as described in 28 above, wherein the alkali metal compound is an alkali metal hydroxide.

32. The method for producing an active carbon as described in 28 or 29 above, wherein the alkali metal compound is a compound containing at least one member selected from the group consisting of potassium, sodium and cesium.

33. The method for producing an active carbon as described in 28 or 29 above, wherein the carbonized product is an easily graphitizable carbon.

An active carbon of the present invention is produced by activating a carbonized product such as coke resulting from the heat treatment (burning) of a synthetic resin, a coal-base pitch, a petroleum-base pitch or the like (raw material).

The electrical characteristics of active carbon greatly depend on the structure properties such as specific surface area, pore distribution and crystal structure of the active carbon. For obtaining an active carbon useful as an electrode material, the structure of carbonized product, the carbonization conditions and the activation conditions must be optimized. In the present invention, the material used as the material of active carbon is a general thermoplastic resin such as vinyl chloride-base resin, polyacrylonitrile, polybutyral, polyacetal, polyethylene, polycarbonate and polyvinyl acetate, or a pitch-base material such as petroleum-base pitch and coal-base pitch. In addition, a condensed polycyclic hydrocarbon compound such as naphthalene, phenanthrene, anthracene, triphenylene and pyrene, and a condensed heterocyclic compound such as indole, quinoline, carbazole and acridine can also be used. Among these materials, the pitch-base materials such as petroleum-base pitch and coal-base pitch are preferred in view of low price and high carbonization yield.

Easily-graphatizable carbon which can be converted to graphite by a high-temperature treatment at around 3300K (about 3,000° C.) may be used, for example, a petroleum-base coke, a coal-base pitch coke, a polyvinylchloride coal and 3,5-dimethylphenolformaldehyde resin coal.

When a coal-base pitch is selected, the coal-base pitch has less side chains and a high proportion of aromatic compounds as compared with the petroleum-base carbon material and comprises polycyclic aromatic compounds having various molecular structures in mixture, therefore, the active carbon starting from this material is considered to form various complicated microcrystal structures or the like originated in these compounds and expresses excellent electrical characteristics. The coal-base pitch selected is not particularly limited but those having a softening point of 100° C. or less, preferably from 60 to 90° C., can be used.

In the inside of the active carbon of the present invention, an alkaline earth metal compound is contained.

The alkaline earth metal compound may be sufficient if it is a compound containing at least one alkaline earth metal element selected from the group consisting of beryllium, magnesium, calcium, strontium, barium and radium, and examples thereof include alkaline earth metals and oxides, hydroxides, chlorides, bromides, iodides, fluorides, phosphates, carbonates, sulfides, sulfates and nitrates of an alkaline earth metal.

The alkaline earth metal compound is preferably an oxide, a carbonate or a sulfide of at least one alkaline earth metal element selected from beryllium, magnesium, calcium, strontium, barium and radium. Specific examples thereof include magnesium oxide, calcium oxide, magnesium fluoride, calcium fluoride, magnesium phosphate, calcium phosphate, magnesium carbonate, calcium carbonate, magnesium sulfide, calcium sulfide and barium sulfate. In the active carbon, two or more alkaline earth metal compounds may be contained. Among these, calcium compounds are preferable, especially calcium oxide or hydroxide, carbonate, sulfide, etc. of calcium which become calcium oxide by heating.

The alkaline earth metal compound contained in the inside of the active carbon particle suitably has a compound particle size of 10 μm or less, preferably 5 μm or less, more preferably 1 μm or less, though this varies depending on the particle size of active carbon. The compound particle size is 1 μm or less as circumstances demand, preferably 0.1 μm or less and more preferably 0.01 μm or less.

The content of the alkaline earth metal compound in the active carbon is preferably from 30 to 100,000 ppm by mass, more preferably from 40 to 5,000 ppm by mass, still more preferably from 50 to 1,000 ppm by mass, based on the entire amount of active carbon.

The alkaline earth metal compound is added to a raw material at the production of the active carbon. As for the addition method, for example, an alkaline earth metal compound powder is added to a raw material powder. Also, an alkaline earth metal compound may be added to a melt of the raw material.

The active carbon is obtained from the raw material through a carbonization step and an activation step and at the heating in these steps, the alkaline earth metal compound may be decomposed, for example, a hydroxide or a carbonate may be decomposed into an oxide. The kind, particle size and amount added of the alkaline earth metal compound are determined by taking account of the change in particle size or mass accompanying decomposition or the carbonization ratio of raw material.

After the alkaline earth metal compound is added to the raw material, the material is heat-treated and thereby carbonized. This carbonization step may be performed by a general method of heating the material to a temperature of about 1,000° C., but this step is preferably performed by the method of elevating the temperature at a temperature rising rate of 3 to 10° C./hr, more preferably from 4 to 6° C./hr, to a temperature of 400 to less than 600° C., preferably from 450° C. to 550° C., keeping a constant temperature in this range for 5 to 20 hours, more preferably from 8 to 12 hours, then elevating the temperature at the same temperature rising rate to 600 to 900° C., preferably from 650 to 850° C., and keeping a constant temperature in this range for 1 to 20 hours, more preferably 1 to 12 hours.

There is no limitation on the heat treatment method but industrially, a heat treatment in a rotary kiln, a tunnel kiln or the like is preferred because this is economical and highly productive.

When the raw material of the active carbon is heated at 400 to 900° C., a thermal decomposition reaction occurs to cause the elimination of gas/light fraction and the residue is polycondensed and finally solidified. The microscopic bonding state between carbon atoms is almost determined at the first stage of this carbonization step and the structure of carbons determined in this step is considered to determine the base of the structure of the final product active carbon.

The role (operation mechanism) of the alkaline earth metal compound in the active carbon of the present invention is not clearly known but the compound is considered to participate in the carbonized product structure and ultimately in determining the active carbon structure, thereby contributing to the enhancement of characteristics of the active carbon, or take action at the charge or discharge of the electric double layer capacitor to enhance the characteristics.

The heat treatment (carbonization) step is also effectively performed in the vapor of an alkali metal compound. The alkali metal catalytically works in the carbonizing step. More specifically, the crosslinked bonding between aromatics in the pitch is accelerated and a carbonization reaction proceeds. Examples of the alkali metal compound include compounds such as sodium, potassium and cesium.

As for the method of practicing the heat treatment in the vapor of an alkali metal, for example, the heat treatment can be performed by heating the system of carbonization step while introducing thereinto an alkali metal compound vapor volatilized from the alkali activation reaction system which is described later. Also, when the raw material is disposed in the periphery of a reaction vessel for the alkali activation reaction and exposed to the alkali metal compound vapor volatilized from the alkali activation reaction system and these systems are heated at the same time, the heat treatment (carbonization) step and the alkali activation step can be performed in parallel. By this practice, the treatment time as a whole can be shortened and also, the cost of energy for heating can be saved.

The carbonized product is roughly ground into a size on the order of about from 1 to 30 mm and/or ground to a particle size of about from 1 to 100 μm, then mixed with an alkali metal compound as an activator and heated to form pores in the carbonized product, thereby obtaining a porous active carbon.

The alkali activator is not particularly limited as long as it is a compound containing an alkali metal, however, compounds which melt during activation provide a higher effect. Hydroxides, carbonates, sulfides and sulfates of potassium, sodium and cesium are preferred. Examples of the compound which can be used include potassium hydroxide, sodium hydroxide, cesium hydroxide, potassium carbonate, sodium carbonate, potassium sulfide, sodium sulfide, potassium thiocyanate, potassium sulfate and sodium sulfate. Among these, preferred are potassium hydroxide and sodium hydroxide, more preferred is potassium hydroxide. These compounds may be used individually or as a mixture of two or more thereof, for example, sodium hydroxide/potassium hydroxide, sodium hydroxide/potassium hydroxide/cesium hydroxide, etc.

The amount of the alkali metal compound mixed is, in terms of a mass ratio to the raw material of the active carbon by taking the raw material as 1, approximately from 0.5 to 7, preferably on the order of 1 to 5, more preferably on the order of 2 to 4. If the mass ratio of the alkali metal compound mixed is less than 0.5, pores poorly grow, whereas if it exceeds 7, overactivation proceeds to cause, for example, rupture of the pore wall and therefore, pores (micropores) are liable to decrease, giving rise to decrease in the specific surface area.

The activation treatment temperature varies depending on the kind and shape of raw material and the activating reaction rate (activation reaction rate) but this treatment is performed at 250 to 1,000° C., preferably from 500 to 900° C., more preferably from 600 to 800° C. If the activation temperature is less than 250° C., the activation insufficiently proceeds to form less pores in the active carbon and when this active carbon is used as a polarizable electrode material of an electric double layer capacitor, the electric capacitance decreases. If the activation temperature exceeds 1,000° C., there arise problems such that the pores in the active carbon are made smaller in size, the charging properties at a high current density seriously decrease, or the activation reactor is severely corroded.

After the completion of alkali activation, a washing step where the active carbon is washed with water to clean the alkali component, neutralized with a hydrochloric acid, a sulfuric acid, a nitric acid or the like, and again washed with water to clean the acid is preferably provided. The active carbon passed through the washing step can be used after it is thoroughly dried.

The reactor for performing the activation is not particularly limited and the same reactor as used in the heat treatment step can be used. For example, a fixed bed heating furnace, a fluidized bed heating furnace, a moving bed heating furnace, an internal or external heating rotary kiln and an electric furnace all can be suitably employed.

After the completion of activation step and washing step, the active carbon is preferably ground into fine powder particles having an average particle size of 0.1 to 100 μm, preferably about 1 to 100 μm and more preferably about 5 to 30 μm. The grinder used in this grinding step is not particularly limited but a ball mill, a vibrating mill, an attrition mill, a jet mill and the like can suitably be used.

The thus-obtained active carbon has characteristics such that a high electric capacitance is exerted from the first cycle even if an excessive voltage is not applied, the retention of electric capacitance is high and the expansion of electrode is less caused.

The active carbon after activation in one embodiment is observed through a transmission microscope and found to comprise a turbostratic structure scarcely having graphite or graphite-like crystal. Also, the XPS (X-ray photoelectron spectroscopy) analysis reveals that an alkaline earth metal compound is scarcely present on the active carbon surface (in a depth of about 10 nm from the surface) but diffused as a submicron-order particle inside the active carbon particle. Furthermore, the ratio of D peak (1,360 cm$^{-1}$) height to G peak (1,580 cm$^{-1}$) height (height from the base line to the peak point in the measured curve) in the Raman spectrum is found to be from 0.8 to 1.2.

Here, the intensity ratio of D peak to G peak in the Raman spectrum is used as an index showing the graphitization degree of carbon material. When this intensity ratio is shown as a peak height ratio, as the graphitization degree is higher, the value becomes smaller. In the case of an active carbon having a graphitic crystal, the ratio takes a value of about 0.6 in most cases, but in the case of the active carbon of the present invention, which is almost free of graphitic crystal, the ratio takes a value of 0.8 to 1.2.

The active carbon of the present invention has a BET specific surface area of 10 to 2,000 m$^2$/g and preferably of 100 to 1,200 m$^2$/g as determined by the nitrogen adsorption method and this is smaller than the BET specific surface area of active carbons obtained by a conventional method (generally from 2,000 to 3,000 m$^2$/g). The active carbon used as an electrode for capacitors needs to have a certain amount or more of pores of 20 to 50 Å which are considered to contribute to the expression of capacitance and the diffusion of electrolyte. In the active carbon in one embodiment of the present invention, the volume of pores of 20 to 50 Å (from 2 to 5 nm) is 0.02 ml/g or more as determined by the BJH (Barrett, Joyner and Halenda) method.

By virtue of such structure and pores, a high electric capacitance can be exerted from the first cycle even if the active carbon after activation does not pass through a step of applying an excessive voltage to intercalate an ion between graphite layers. Furthermore, the active carbon has passed through a step of thorough carbonization and this seems to bring about reduction in the amount of functional group on the carbon surface and prevention of the electric capacitance from deterioration accompanying repeated charging and discharging.

The tap density of the active carbon after activation is measured by a tap density meter (manufactured by Kuramochi Kagaku Kikai Seisakusho) and found to be from 0.35 to 0.70 g/ml with a tapping number of 50 times. The powder resistance is 0.4 Ωcm or less at 1.0 MPa.

The surface of the active carbon of the present invention may be coated with a porous carbon layer comprising non-graphitizable carbon. Coating a porous carbon layer comprising non-graphitizable carbon on the surface of the active carbon further enables to control the expansion and contraction of the active carbon when charging and discharging. The coating may be performed on overall of the surface or in an island-structure, however, preferably, about 30 to 70% of the surface is coated.

The method of producing active carbon coated with a porous carbon layer is not particularly limited. However, it is preferable to coat an adherent polymer on the carbonized product after the first heat-treatment stage (400 to 600° C.), and thereafter to perform the second heat-treatment stage (600 to 900° C.) and activation.

For example, it is preferable to coat a coating material on the surface of the base material such as coax carbon powder (hereinafter referred to as a base material or carbon base material) and perform heat-treatment (heat setting, firing, etc.) and activation (gas activation, chemical activation, etc.).

As a coating material, a non-graphitizable carbon material is preferable to be used, which produces so-called hard carbon by heat treatment and enables to control the expansion and contraction of the carbon base material when charging and discharging. A non-graphitizable carbon material is, for example, at least one member selected from the group consisting of phenol resin, polyvinyl alcohol resin, furan resin, cellulose resin, polystyrene resin, polyimide resin, epoxy resin, but not limited thereto specifically.

Especially, when using phenol resin mixed with drying oil or a fatty acid thereof, a dense carbon material is obtainable. The phenol resin and the unsaturated fatty acid bonding in the drying oil causes a chemical reaction and turns out to phenol resin modified with drying oil. The modified phenol resin is assumed to temper the decomposition in the process of heat (or firing) treatment and prevent foaming. Moreover, drying oil does not only have a double bonding but also contains an ester bonding with fairly long alkyl group, which is also assumed to participate in escape of the gas in the firing process.

As a phenol resin, unmodified phenol resin such as novolak and resole which is produced by the reaction between a phenol and an aldehyde can be used as well as partly-modified phenol resin. Furthermore, rubber such as nitrile rubber may be mixed in the phenol resin, if necessary. Phenols include phenol, cresol, xylenol, alkylphenol containing an alkyl group of C20 or less.

The phenol resin mixed with a drying oil or fatty acid thereof can be prepared by subjecting a phenol to addition reaction with a drying oil in the presence of a strong acid catalyst in advance and then with formalin after adding a basic catalyst to make the system basic, or by reacting a phenol with formalin and then adding drying oil.

Drying oil is generally a vegetable oil known as wood oil (tung oil), linseed oil, dehydrated castor oil, soybean oil, cashew nut oil, etc. or may be fatty acid thereof, which is characteristically capable of being dried and solidified in relatively short time when kept standing in air in a shape of a thin film.

The amount of the drying oil or fatty acid thereof is suitably, for example, 5 to 50 parts by mass to 100 parts by mass of the phenol resin. The amount of the drying oil or fatty acid thereof exceeding 50 parts by mass is not desirable since the adhesion properties thereof tend to deteriorate.

When coating the base material with the polymer, the coating is facilitated by adjusting the viscosity of the polymer by diluting it with acetone, ethanol, toluene, etc.

Although the coating may be performed under atmospheric pressure, under pressure or reduced pressure, the coating under reduced pressure improves the affinity of the carbonaceous powder to the polymer and is preferable.

The coating is preferably performed by mixing and stirring the carbon base material and the above-mentioned polymer. The stirring method is not specifically limited and apparatus such as a ribbon mixer, screw-type kneader, Spartan Ryuzer, Loedige mixer, planetary mixer and all-purpose mixer may be used.

The temperature and time of the stirring treatment is appropriately selected according to the base carbonaceous powder material, the ingredient and viscosity of the polymer, etc. and desirable temperature is generally about 0 to 50° C. and preferably in the range of about 10 to 30° C.

It is desirable that adjusting the viscosity of the mixture of the base carbon material and polymer to 500 Pa·s or less under the mixing temperature by using the diluting solvent as well as adjusting the mixing time. As the diluting solvent, one having high compatibility with the polymer can be used. An example includes alcohols, ketones, aromatic hydrocarbons, esters, and methanol, ethanol, butanol, acetone, methylethylketone, toluene, ethyl acetate, butyl acetate, etc. are preferable.

After the stirring, it is desirable to remove part or all of the solvent. Removing the solvent is performed by a known method such as hot-air drying and vacuum drying.

The drying temperature depends on the boiling point of the used solvent, vapor pressure, etc., however, it is specifically 50° C. or higher, preferably 100 to 1,000° C. and more preferably 150 to 500° C.

Most of the known heating devices can be used for heat curing. However, a rotary kiln and a conveyor continuous furnace and the like are preferable in a production process by enabling continuous treatment.

The addition amount of the phenol resin is 2 to 30 mass %, preferably 4 to 25 mass % and more preferably 6 to 18 mass %.

The heat treatment is performed at a temperature of 1200° C. or lower, preferably at 400 to 1,000° C. and more preferably at 500 to 800° C.

If the heat treatment temperature is too high, the activation reaction performed subsequently does not proceed, while the carbonation reaction does not proceed if the heat treatment temperature is too low.

The desirable particle size of the material is 1 to 70 μm in average, preferably 3 to 30 μm and more preferably 3 to 15 μm. The average particle size can be determined by a laser diffraction and scattering method. If the average particle size is less than 1 μm, the particle easily drops out from the electrode plate and shorts out.

If a particle having an average particle size exceeding 70 μm is mixed, irregularities on the electrode surface increase, leading to a cause to damage a separator used in a battery.

Next, the active carbon having added thereto a vapor grown carbon fiber is described below.

The active carbon of the present invention is more enhanced in the characteristics by adding thereto a vapor grown carbon fiber.

As a carbon fiber, pitch-based carbon fiber, vapor grown carbon fiber, etc. may be used, however, the vapor grown carbon fiber is desirable, which has crystals growing axially of the fiber as well as branches.

The vapor grown carbon fiber is produced by heating an organic compound (e.g. benzene) and a metal catalyst particle at a high temperature (e.g. at about 1,000° C.) in a hydrogen stream.

This vapor grown carbon fiber can be used as it is produced or after it is burned at 1,000 to 1,500° C. or further subjected to a graphitization treatment. However, the fiber as it is produced or after burned at about 1,500° C. is preferable.

A desirable form of the vapor grown carbon fiber includes a branched fiber. The branched fiber has a hollow structure, wherein the whole fiber communicates with each other including the branched part. Accordingly, the carbon layer constructing the cylinder part of the fiber is continuous. The hollow structure is formed of the carbon layer being rolled in a cylinder shape and includes the structure having imperfect cylinders, partially cut-off cylinders, laminated two carbon layers bonded into one layer, etc. Moreover, the cross-section of the cylinder is not limited to a perfect circle but also oval and polygon.

With respect to the crystallinity of the carbon layer, the spacing of the carbon layer $d_{002}$ is not specifically limited. Preferably, $d_{002}$ is 0.3395 nm or less and more preferably 0.3380 nm or less by x-ray diffraction measurement, and the thickness of the crystal along the c-axis, Lc, is 40 nm or less.

The vapor grown carbon fiber is a carbon fiber having an outer diameter of 500 nm or less and an aspect ratio of 10 or more, preferably having an outer diameter of 50 to 500 nm and the fiber length of 1 to 100 μm (aspect ratio of 2 to 2,000) or an outer diameter of 2 to 50 nm and and the fiber length of 0.5 to 50 μm (aspect ratio of 10 to 25,000).

By mixing this vapor grown carbon fiber with the active carbon, the contact resistance of particles with each other is reduced, the electrode strength is increased and the durability as a polarizable electrode is enhanced.

The vapor grown carbon fiber can also be used after gas-activating or chemical-activating treatment and in this case, the surface structure is preferably controlled to have a micropore (pore of 20 Å or less) volume of 0.01 to 0.4 ml/g and a BET specific surface area of 30 to 1,000 $m^2$/g. If a carbon fiber having many micropores is mixed, ion diffusion resistance inside the electrode increases and is not desirable.

When stirring the above-mentioned raw material and polymer to coat the raw material with non-graphitizable carbon, the active carbon having fusion-bonded carbon fiber can be produced by mixing the carbon fiber. The thus-produced active carbon having fusion-bonded carbon fiber enables to further control the expansion and contraction at charging and discharging. It is also effective in case it improves the mechanical strength of the polarizable electrode itself.

The amount of the vapor grown carbon fiber mixed in the active carbon of the present invention is preferably from 0.02 to 50 mass %, more preferably from 0.05 to 30 mass %, still more preferably from 0.5 to 20 mass %. If the amount mixed is less than 0.02 mass %, the number of contact points with the active carbon particle does not increase and therefore, a sufficiently high effect cannot be obtained, whereas if the amount mixed exceeds 50 mass %, the active carbon content in the polarizable electrode decreases and in turn the electric capacitance decreases.

A polarizable electrode and an electric double layer capacitor each can be produced from the active carbon of the present invention by a known method. More specifically, the polarizable electrode is produced, for example, by a method of adding an electrically conducting agent and a binder to the active carbon and kneading and then rolling it, a method of adding an electrically conducting agent, a binder and, if desired, a solvent to the active carbon to form a slurry, coating it on an electrically conducting substrate to a predetermined thickness and evaporating the solvent at room temperature or under heating, or a method of mixing a resin with the active carbon and sintering it. The electrically conducting substrate used here is a foil or a plate of aluminum, carbon-coated aluminum, stainless steel, titanium or the like, having a thickness of approximately from 10 µm to 0.5 mm.

For example, a powder of carbon black (e.g., Ketjen black, acetylene black), natural graphite, artificial graphite, titanium oxide, ruthenium oxide or the like is added, if desired, as an electrically conducting agent to the active carbon powder having an average particle size of approximately from 5 to 100 µm. Thereto, a binder such as polytetrafluoroethylene (PTFE), polyvinylidene fluoride, fluoroolefin/vinyl ether copolymer crosslinked polymer, carboxymethyl cellulose, polyvinylpyrrolidone, polyvinyl alcohol or polyacrylic acid is added and the mixture is formed into a sheet having a thickness of approximately from 0.1 to 0.5 mm. The obtained sheet is vacuum-dried at a temperature of approximately from 100 to 200° C. and then punched into a predetermined shape to obtain an electrode. A metal plate as a current collecting material is laminated on this electrode and two electrode sheets are superposed through a separator by directing each metal plate toward the outside and dipped in an electrolytic solution to produce an electric double layer capacitor.

The electrolytic solution for use in the electric double layer capacitor may be either a known non-water solvent electrolytic solution or a water-soluble electrolytic solution. Furthermore, polymer solid electrolyte and polymer gel electrolyte which are nonaqueous system electrolyte and ionic liquid may also be used as well as electrolytic solution.

Examples of the aqueous system (water-soluble electrolytic solution) include an aqueous sulfuric acid solution, an aqueous sodium sulfate solution, an aqueous sodium hydroxide solution, an aqueous potassium hydroxide solution, an aqueous ammonium hydroxide solution, an aqueous potassium chloride solution and an aqueous potassium carbonate solution.

The non-aqueous system (non-water solvent electrolytic solution) is preferably a solution using, as the electrolyte, a quaternary ammonium salt or quaternary phosphonium salt comprising a cation represented by $R^1R^2R^3R^4N^+$ or $R^1R^2R^3R^4P^+$ ($R^1$, $R^2$, $R^3$ and $R^4$ each is independently an alkyl group having a carbon number of 1 to 10 or an allyl group) and an anion (e.g., $BF_4^-$, $PF_6^-$, $ClO_4^-$), such as $(C_2H_5)_4NBF_4$, $(C_2H_5)_3(CH_3)NBF_4$, $(C_2H_5)_4PBF_4$ and $(C_2H_5)_3(CH_3)PBF_4$, and using an organic solvent such as ether (e.g., diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, ethylene glycol phenyl ether), amide (e.g., formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, hexamethylphosphorylamide), sulfur-containing compound (e.g., dimethylsulfoxide, sulfolane), dialkyl ketone (e.g., methyl ethyl ketone, methyl isobutyl ketone), cyclic ether (e.g., ethylene oxide, propylene oxide, tetrahydrofuran, 2-methoxytetrahydrofuran, 1,2-dimethoxyethane, 1,3-dioxolane), carbonate (e.g., ethylene carbonate, propylene carbonate), γ-butyrolactone, N-methylpyrrolidone, acetonitrile and nitromethane. Additionally, a carbonate-base non-water solvent such as ethylene carbonate and propylene carbonate can preferably be used. Two or more electrolytes and/or two or more solvents may be used.

Polymer used in the polymer solid electrolyte and polymer gel electrolyte which are nonaqueous system electrolyte includes polyethylene oxide derivative and the polymer containing the derivative, polypropylene oxide derivative and the polymer containing the derivative, phosphoric ester polymer, polycarbonate derivative and the polymer containing the derivative. Ionic liquid, which may not be dissolved in the solvent of the above solutions but in liquid form, includes 1-ethyl-3-methylimidazolium tetrafluoroborate and 1-ethyl-3-methylimidazolium trifluorosulfonate.

The separator used, if desired, to intervene between electrodes may be sufficient if it is a porous separator of transmitting the ion. A microporous polyethylene film, a microporous polypropylene film, a polyethylene nonwoven fabric, a polypropylene nonwoven fabric, a glass fiber-mixed nonwoven fabric, a glass mat filter or the like can be preferably used.

The electric double layer capacitor of the present invention can take any constitution such as a coin type where a pair of sheet-like electrodes having interposed therebetween a separator is housed in a metal case together with an electrolytic solution, a winding type where a pair of positive electrode and negative electrode are wound with an intervention of a separator, and a laminate type where a large number of sheet-like electrodes are stacked through a separator.

BEST MODE FOR CARRYING OUT THE INVENTION

The present invention is described in greater detail below by referring to representative examples. These are mere examples for the purpose of description and the present invention is not limited thereto. In the following examples, each property was measured by the following measuring method.
(1) BET Specific Surface Area and Pore Volume The BET specific surface area and pore volume each was calculated by the BET method and the BJH method from a nitrogen adsorption isotherm at a liquid nitrogen temperature measured using NOVA1200 manufactured by Quantachrome. The nitrogen adsorption amount was measured at a relative pressure ($P/P_0$) of 0.01 to 1.0.
(2) Raman Spectrum The Raman spectrum of active carbon was measured with a slit of 500 µm and an exposure for 60 seconds by using an Ar laser of 514.5 nm as the excitation light and CCD (Charge Coupled Device) as the detector.

(3) Electric Capacitance 10 parts by mass of PTFE (polytetrafluoroethylene) and 10 parts by mass of carbon black were added to 80 parts by mass of an active carbon having an average particle size of 30 μm and these were kneaded in an agate mortar. The kneaded material was rolled into a sheet form having a thickness of 0.2 mm by a roller and the sheet was punched into a disk form having a diameter of 20 mm. The obtained disk sheet was vacuum-dried at 200° C. one day and one night and used as a polarizable electrode.

Figure 1:
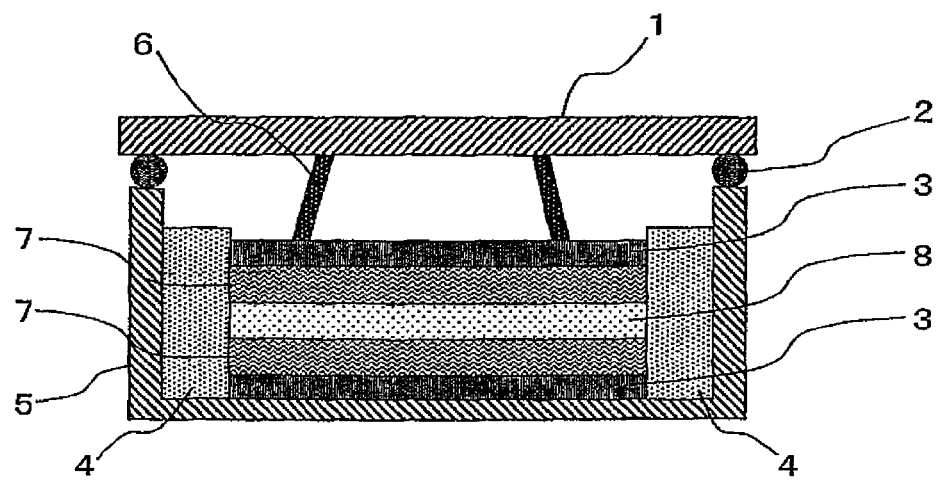
FIG. 1 is a cross section of a cell for evaluation of an electric double layer capacitor used in the examples.

This electrode was used by assembling a cell for evaluation whose cross section is shown in FIG. 1 in a glove box where high-purity argon was circulated. In FIG. 1, 1 is an aluminum-made top lid, 2 is a fluororubber-made O-ring, 3 is a current collecting material comprising aluminum, 4 is an insulating material comprising Teflon (registered trademark), 5 is an aluminum-made container, 6 is an aluminum-made leaf spring, 7 is a polarizable electrode, and 8 is a 1 mm-thick separator comprising glass fiber. The electrolytic solution used was LIPASTE-P/EAFIN (1 mol/liter) (trade name, produced by Tomiyama Pure Chemical Industries, Ltd.) using PC (propylene carbonate) as the solvent and $(C_2H_5)_4NBF_4$ as the electrolyte.

Figure 2:
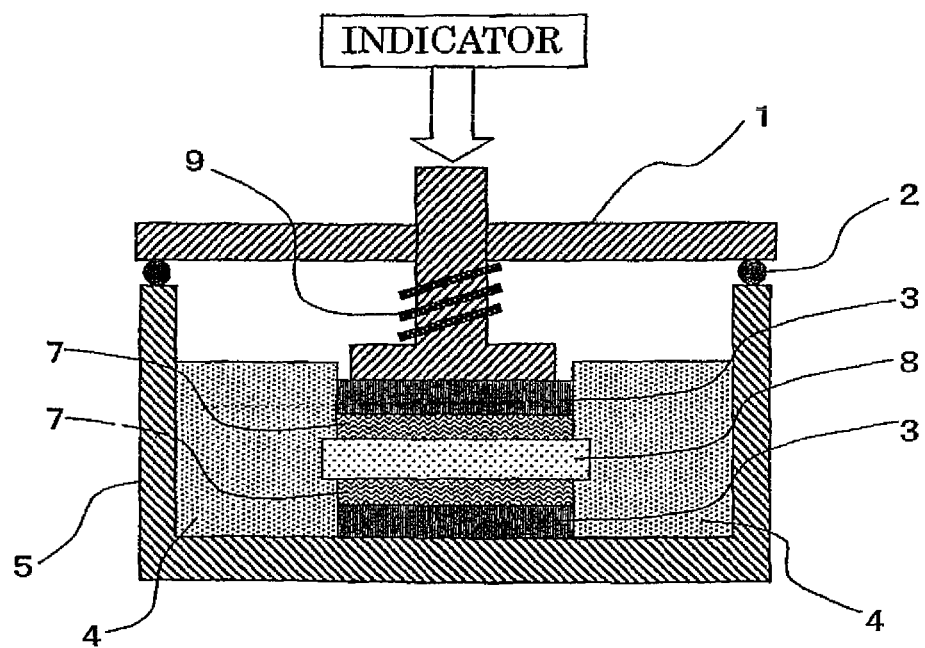
FIG. 2 is a cross section of a cell for evaluation used for the measurement of the expansion coefficient change of the electrode when charging and discharging.

The expansion coefficient of the electrode when charging and discharging was determined using a cell for evaluation in FIG. 2 by measuring the change in the thickness of the electrode using an indicator. As the coil spring 9 in FIG. 2 to hold the electrode, one that requires weight of about 0.1 to 1.0 kgf to compress by 1 cm is available. In the examples one that requires weight of 0.3 kgf was used. The temperature at the measurement was room temperature (20 to 30° C.). The expansion coefficient (%) of the electrode when a voltage of 2.5 V is applied can be calculated by {((the thickness of the electrode when charging at 2.5 V)−(the thickness of the electrode before charging)/(the thickness of the electrode before charging)}×100.

In the measurement of charge and discharge, a charge/discharge tester HJ-101SM6 manufactured by Hokuto Denko Corporation was used and charging/discharging of from 0 to 2.5 V or from 0 to 3.0 V was performed with a charge/discharge current of 5 mA (1.6 mA/cm$^2$), 50 mA (16 mA/cm$^2$) or 150 mA (48 mA/cm$^2$). From the discharge curve obtained by the second constant-current discharge, the electric capacitance per mass of active carbon for both electrodes of the electric double layer capacitor (F/g) and the electric capacitance per volume (F/ml) were calculated.

The durability was evaluated by the ratio of the electric capacitance after a charge/discharge cycle test was performed 20 times, to the electric capacitance after the second charge and discharge.

Example 1

Calcium carbonate (10 g) was added to 100 g of coal pitch having a softening point of 86° C. and the pitch was filled in a crucible. The temperature of the crucible was elevated to 500° C. at a temperature rising rate of 5° C./hr, kept at the temperature for 10 hours (first stage), then elevated to 700° C. at the same temperature rising rate, and kept at this temperature for 5 hours (second stage), thereby performing the heat treatment. The resulting carbonized product was mixed with a 2.5-fold amount of KOH, in terms of mass ratio, and filled in a crucible. Then, the temperature of the crucible was elevated to 750° C. at 3° C./hr and kept at 750° C. for 60 minutes, thereby performing the activation. The carbonized product after the activation was washed with 1N hydrochloric acid and then with distilled water to remove residual KOH and metal impurities and thereafter, vacuum-dried at 200° C. to obtain an active carbon.

The specific surface area of this active carbon was 930 m$^2$/g, the volume of pores of 20 to 50 Å was 0.0416 ml/g as determined by the BJH method, and the ratio of D peak height to G peak height calculated from the Raman spectrum was 0.92.

The electric capacitance was 36.5 F/g and 31.0 F/ml at the charge/discharge of 2.5 V with a charge/discharge current of 5 mA (1.6 mA/cm$^2$) and the retention of capacitance after 20 cycles of charging/discharging was 98.4%. The electric capacitance was 37.7 F/g and 32.0 F/ml at the charge/discharge of 3.0 V with a charge-discharge current of 5 mA (1.6 mA/cm$^2$) and the retention of capacitance after 20 cycles of charging/discharging was 96.9%. The average expansion coefficient of positive and negative electrodes was 15%.

Example 2

An active carbon was produced in the same manner as in Example 1 except for adding 10 g of calcium hydroxide in place of 10 g of calcium carbonate in Example 1.

The specific surface area of this active carbon was 892 m$^2$/g, the volume of pores of 20 to 50 Å was 0.0398 ml/g as determined by the BJH method, and the ratio of D peak height to G peak height calculated from the Raman spectrum was 0.93.

The electric capacitance was 36.8 F/g and 31.3 F/ml at the charge/discharge of 2.5 V with a charge/discharge current of 5 mA and the retention of capacitance after 20 cycles of charging/discharging was 98.3%. The electric capacitance was 37.5 F/g and 31.9 F/ml at the charge/discharge of 3.0 V with a charge/discharge current of 5 mA and the retention of capacitance after 20 cycles of charging/discharging was 96.8%.

The average expansion coefficient of electrodes after charging was 14%.

Example 3

A polarizable electrode material was prepared by mixing 5 mass % of vapor grown carbon fiber (average diameter: 180 nm, average length: 10 μm) with the active carbon obtained by the method of Example 1. The electric capacitance at the charge/discharge of 2.5 V with a charge/charge current of 5 mA (1.6 mA/cm$^2$) was 36.4 F/g and 32.4 F/ml and the retention of capacitance after 20 cycles of charging/discharging was 98.9%. The electric capacitance at the charge/discharge of 3.0 V with a charge/discharge current of 5 mA (1.6 mA/cm$^2$) was 39.5 F/g and 35.2 F/ml and the retention of capacitance after 20 cycles was 97.7%. The average expansion coefficient of positive and negative electrodes was 10%.

Example 4

An active carbon was produced in the same manner as in Example 1 except for adding 10 g of calcium sulfide in place of 10 g of calcium carbonate in Example 1 and performing the heat treatment by keeping the second stage temperature at 800° C., and the obtained active carbon was used as a polarizable electrode material.

The specific surface area of this active carbon was 173 m$^2$/g, the volume of pores of 20 to 50 Å was 0.0271 ml/g as determined by the BJH method, and the ratio of D peak height to G peak height in the Raman spectrum was 0.93.

The electric capacitance was 32.6 F/g and 31.9 F/ml at the charge/discharge of 2.5 V with a charge/discharge current of 5 mA (1.6 mA/cm$^2$) and the retention of capacitance after 20 cycles of charging/discharging was 98.7%. The electric capacitance was 35.5 F/g and 34.8 F/ml at the charge/discharge of 3.0 V with a charge/discharge current of 5 mA (1.6 mA/cm$^2$) and the retention of capacitance after 20 cycles was 97.2%. The average expansion coefficient of positive and negative electrodes was 30%.

Example 5

After potassium hydroxide (50 g) was added to 10 g of the same vapor grown carbon fiber as used in Example 3 and these were heat-treated at 750° C. (micropore volume: 0.3 ml, BET specific surface area: 530 m$^2$/g), the resulting product (5 mass %) was mixed with the active carbon produced by the method of Example 4 to obtain a polarizable electrode material. The electric capacitance at the charge/discharge of 2.5 V with a charge/discharge current of 5 mA (1.6 mA/cm$^2$) and was 33.5 F/g and 33.5 F/ml, and the retention of capacitance after 20 cycles of charging/discharging was 99.0%. The electric capacitance at the charge/discharge of 3.0 V with a charge/discharge current of 5 mA (1.6 mA/cm$^2$) was 34.5 F/g and 34.5 F/ml and the retention of capacitance after 20 cycles of charging/discharging was 98.0%. The average expansion coefficient of positive and negative electrodes was 5%.

Comparative Example 1

An active carbon was produced in the same manner as Example 1 except for not adding calcium carbonate in Example 1. The calcium compound content in the obtained active carbon was 25 ppm by mass in terms of calcium element.

The specific surface area of this active carbon was 800 m$^2$/g, the volume of pores of 20 to 50 Å was 0.038 ml/g as determined by the BJH method, and the ratio of D peak height to G peak height calculated from the Raman spectrum was 0.89.

The electric capacitance was 36.0 F/g and 30.6 F/ml at the charge/discharge of 2.5 V with a charge/discharge current of 5 mA and the retention of capacitance after 20 cycles of charging/discharging was 98.0%. The electric capacitance was 37.0 F/g and 31.5 F/ml at the charge/discharge of 3.0 V with a charge/discharge current of 5 mA and the retention of capacitance after 20 cycles of charging/discharging was 96.5%.

The average expansion coefficient of electrodes after charging was 50%.

Comparative Example 2

A petroleum coke was used as the carbon material and this material was mixed with a 2.5-fold amount of KOH, in terms of mass ratio, filled in a crucible, kept at 750° C. for 60 minutes and thereby activated. The activated carbon material was washed with 1N hydrochloric acid and then with distilled water to remove residual KOH and metal impurities and thereafter, vacuum-dried at 200° C. to obtain an active carbon. The specific surface area of this active carbon was 1,905 m$^2$/g and the ratio of D peak height to G peak height in the Raman spectrum was 0.98. Also, the calcium compound content in the active carbon was 23 ppm by mass in terms of calcium element.

The electric capacitance at the charge/discharge of 2.5 V with a charge/discharge current of 5 mA (1.6 mA/cm$^2$) was 44.5 F/g and 24.0 F/ml and the retention of capacitance after 20 cycles of charging/discharging was 96.3%. The electric capacitance at the charge/discharge of 3.0 V with a charge/discharge current of 5 mA (1.6 mA/cm$^2$) was 45.0 F/g and 24.3 F/ml and the retention of capacitance after 20 cycles of charging/discharging was 94.0%. The average expansion coefficient of positive and negative electrodes was 20%.

Comparative Example 3

MCMB (mesocarbon microbeads, produced by Osaka Gas Co., Ltd.) was used as the carbon material and this material was mixed with a 5-fold amount of KOH, in terms of mass ratio, filled in a crucible, kept at 750° C. for 60 minutes and thereby activated. The activated carbon material was washed with 1N hydrochloric acid and then with distilled water to remove residual KOH and metal impurities and thereafter, vacuum-dried at 200° C. to obtain an active carbon. The specific surface area of this active carbon was 127 m$^2$/g, the volume of pores of 20 to 50 Å was 0.013 ml/g, and the ratio of D peak height to G peak height in the Raman spectrum was 0.92. Also, the calcium compound content in the active carbon was 14 ppm by mass in terms of calcium element.

The electric capacitance at the charge/discharge of 2.5 V with a charge/discharge current of 5 mA (1.6 mA/cm$^2$) was 10.2 F/g and 9.4 F/ml and the retention of capacitance after 20 cycles of charging/discharging was 99.1%. The electric capacitance at the charge/discharge of 3.0 V with a charge/discharge current of 5 mA (1.6 mA/cm$^2$) was 11.5 F/g and 10.6 F/ml and the retention of capacitance after 20 cycles of charging/discharging was 98.5%. The average expansion coefficient of positive and negative electrodes was 70%.

Example 6

Phenol resin partially modified by wood oil prepared by the following method was used as an adherent agent. Wood oil (100 parts by mass), phenol (150 parts by mass) and nonylphenol (150 parts by mass) were mixed and kept at 50° C. Sulfuric acid (0.5 parts by mass) was added thereto and stirred. The mixture was gradually heated and kept at 120° C. for one hour to carry out addition reaction of wood oil and phenols. Then the mixture was cooled to 60° C., added with hexamethylenetetramine (6 parts by mass) and 37 mass % formalin (100 parts by mass), subjected to reaction at 90° C. for about two hours and thereafter vacuum-dried and diluted by being added with methanol and acetone of 100 parts by mass respectively to obtain varnish having a viscosity of 20 mPa·s (20° C., hereinafter called "varnish A").

10 g of calcium carbonate was added to coal pitch having a softening point at 86° C. and filled in a crucible. The temperature of the crucible was elevated to 500° C. at a temperature rising rate of 5° C./hr, kept at the temperature for 10 hours. The resulting carbonized product was pulverized and adjusted to a carbonaceous powder (19.8 g) having an average particle of D50=8 µm. The powder was added with 5.4 parts by mass of varnish A reduced in solid resin content and 12.6 parts by mass of ethanol and stirred. The resulting fully dissolved solution was added with modified phenol resin so as to have solid resin content of 1.3 mass % and kneaded for 30 minutes using a planetary mixer. The kneaded product was vacuum-dried at 80° C. for two hours to remove ethanol. Thereafter the kneaded product was kept in a heating furnace at 700° C. for one hour and cooled. After cooled down to a room temperature, the obtained heat-treated product was mixed with a 2.5-fold amount of potassium hydroxide in terms of mass ratio, and thereby activated in the same manner as in Example 1. In the obtained polarizable positive and negative electrodes, the average expansion coefficient was 5%.

Example 7

An active carbon was produced in the same manner as in Example 6, except 10 mass % of vapor grown carbon fiber was added in kneading. In the obtained polarizable positive and negative electrodes, the average expansion coefficient was 4%.

INDUSTRIAL APPLICABILITY

An object of the present invention is to provide an active carbon containing an alkaline earth metal compound inside the particle and having a BET specific surface area of 10 to 2,000 m$^2$/g, a production method thereof and polarizable electrodes using the same. The active carbon of the present invention can be suitably used for electrodes in a capacitor which exert a high electric capacitance (F/ml) even without applying an excessive voltage, exhibit good durability and ensure a small expansion coefficient of electrode at the charge/discharge.

Furthermore, by mixing a vapor grown carbon fiber to the active carbon, a polarizable electrode and an electric double layer capacitor each having more excellent characteristics can be produced.

What is claimed is:

1. An active carbon comprising an alkaline earth metal compound in the inside of the particle and having a BET specific surface area of 10 to 2,000 m$^2$/g as determined by a nitrogen adsorption method, and wherein the alkaline earth metal compound is a particle having a particle size of 10 μm or less,
wherein
the content of the alkaline earth metal compound is from 30 to 100,000 ppm by mass,
the ratio of the peak height of D peak (1,360 cm$^{-1}$) to the peak height of G peak (1,580 cm$^{-1}$) in the Raman spectrum is from 0.8 to 1.2, and
the volume of pores having a pore size of 20 to 50 Å is in the range of 0.02 ml/g or more as determined by the BJH method using the nitrogen adsorption method.

2. The active carbon as claimed in claim 1, wherein the alkaline earth metal compound is at least one alkaline earth metal compound selected from the group consisting of beryllium, magnesium, calcium, strontium, barium and radium.

3. The active carbon as claimed in claim 2, wherein the alkaline earth metal compound is at least one member selected from the group consisting of alkaline earth metal and oxides, hydroxides, chlorides, bromides, iodides, fluorides, phosphates, carbonates, sulfides, sulfates and nitrates of an alkaline earth metal.

4. The active carbon as claimed in claim 1, wherein the alkaline earth metal compound is at least one member selected from the group consisting of alkaline earth metal and oxides, hydroxides, chlorides, bromides, iodides, fluorides, phosphates, carbonates, sulfides, sulfates and nitrates of an alkaline earth metal.

5. The active carbon as claimed in claim 4, wherein the alkaline earth metal compound is calcium compound.

6. The active carbon as claimed in claim 1, which substantially does not contain a particle having an average particle size of 1 μm or less and/or 100 μm or more.

7. An active carbon wherein a porous carbon layer comprising non-graphitizable carbon is coated on the active carbon as claimed in claim 1.

8. The active carbon as claimed in claim 7, wherein the volume of pores is in the range of 0.01 to 1.55 ml/g as determined by the nitrogen adsorption method.

9. The active carbon as claimed in claim 7, having an average particle size of 3 μm to 70 μm.

10. A polarizable electrode comprising the active carbon as claimed in claim 1.

11. A polarizable electrode comprising the active carbon as claimed in claim 1 and a vapor grown carbon fiber.

12. The polarizable electrode as claimed in claim 11, wherein the vapor grown carbon fiber has a hollow structure and has an outer diameter of 2 to 500 nm and an aspect ratio of 10 to 15,000.

13. The polarizable electrode as claimed in claim 11, wherein the vapor grown carbon fiber has a pore volume of 0.01 to 0.4 ml/g and a BET specific surface area of 30 to 1,000 m$^2$/g as determined by the nitrogen adsorption method.

14. The polarizable electrode as claimed in claim 11, wherein the spacing of the (002) face of the vapor grown carbon fiber, d$_{002}$, is 0.3395 nm or less.

15. The polarizable electrode as claimed in claim 11, wherein the vapor grown carbon fiber is a branched fiber and the hollow structure of the branched part communicates with each other.

16. The polarizable electrode as claimed in claim 11, wherein the vapor grown carbon fiber is mixed in the amount of 0.1 to 20 mass % of the carbon powder material.

17. The polarizable electrode as claimed in claim 11, wherein the vapor grown carbon fiber is fusion bonded to the surface of the active carbon.

18. An electric double layer capacitor comprising the polarizable electrode as claimed in claim 10.

19. The electric double layer capacitor as claimed in claim 18, which contains an organic electrolytic solution obtained by dissolving an electrolyte in an organic solvent.

20. A slurry containing the active carbon as claimed in claim 1.

21. A paste containing the active carbon as claimed in claim 1.

22. An electrode plate, wherein the active carbon as claimed in claim 1 is applied on the surface.

23. An energy device containing an electric double layer capacitor as claimed in claim 18.

* * * * *